Dec. 31, 1940. A. S. MARTIN 2,226,569
DUAL ACCELERATOR CONTROL FOR AUTOMOTIVE VEHICLES
Filed Aug. 23, 1939 2 Sheets-Sheet 1

Inventor,
Arthur Seymon Martin;
By his Atty,
Frederick E. Maynard.

Dec. 31, 1940.  A. S. MARTIN  2,226,569
DUAL ACCELERATOR CONTROL FOR AUTOMOTIVE VEHICLES
Filed Aug. 23, 1939  2 Sheets-Sheet 2

Inventor,
Arthur Seymon Martin,
By his Atty,
Frederick E. Maynard.

Patented Dec. 31, 1940

2,226,569

UNITED STATES PATENT OFFICE 2,226,569

DUAL ACCELERATOR CONTROL FOR AUTOMOTIVE VEHICLES

Arthur Seymon Martin, Santa Ana, Calif.

Application August 23, 1939, Serial No. 291,627

21 Claims. (Cl. 74—513)

The principal purpose of this invention is to provide an improved dual acceleration device for use in motor vehicles whereby the driver may employ either, or both of his feet simultaneously, in operating the accelerator for controlling the vehicle's speed, thereby permitting him at all times to sit in a position of equalized posture and relieving him of the usual fatigue accompanying extended driving.

Another object of this invention is to provide such a device which, when installed in a motor vehicle, will not annoy the driver by interfering with his operation of the brake and clutch pedals.

A further object is to build such an accelerator which will increase by a minimum degree the mechanical operating friction introduced because of its installation within the vehicle.

An additional object of the invention is to provide for such a device that may be installed within a motor vehicle with the minimum of skill and effort, and at the same time be manufactured cheaply.

Efforts have been made in the past to build satisfactory dual control accelerators for employment in motor vehicles but most of these have been found either to interfere with the driver in his use of the foot brake and clutch, or else to be quite difficult of installation, as well as to add a substantial increment of mechanical friction to the operation of the accelerator, and quite frequently, awkard to use. I have disclosed through experimentation extending over a period of years and during thousands of miles of driving under all varieties of conditions that any device or object placed in front of the driver's feet upon or near the floorboard will cause considerable interference in his use of the clutch and brake pedals, and in an emergency may actually prove to be exceedingly dangerous. In a hasty operation of the clutch and brake the toes of the feet will strike any obstructing object which might be located directly in front of these two pedals, and the maximum braking force will not be applied, thereby creating a hazardous condition for an emergency. I have also discovered that surprisingly large objects may be placed immediately behind these brake and clutch pedals without endangering their proper and hasty operation during a critical stop. The foot then merely rocks forwardly, successfully depressing the pedal its full degree. My invention reaps an advantage from the rather tedious acquirement of this knowledge, although the sole slender rod I sometimes mount behind the clutch and brake pedals normally lies on the floor in a position that is usually completely behind the operator's feet.

Having thus briefly described the objects of my invention, the same will now be shown in detail and reference for this purpose may be had to the accompanying drawings in which the preferred embodiment of the invention has been illustrated, and in which.

Figure 2:
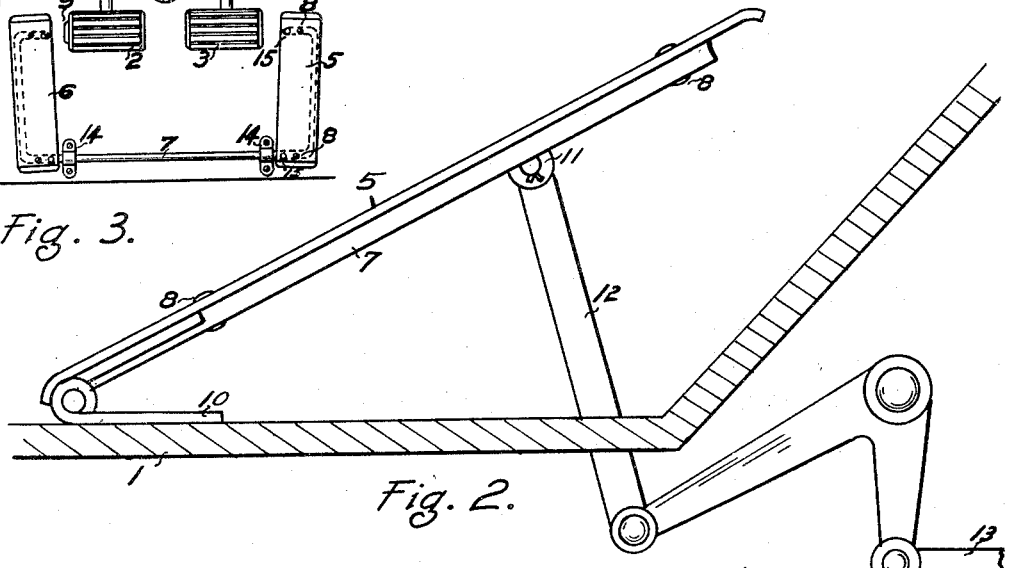
Fig. 2 is a side view of my device showing in more detail its installation upon the floorboard, and its operation.

In the drawings the numeral 1 represents the usual floorboards, in the forward portion of the driving compartment of a motor vehicle. The conventional clutch and service-brake pedals 2 and 3 are shown in their normal locations. A view of the steering post and rod, designated by the numeral 4, is shown in several of the drawings. Referring to Fig. 2, 12 signifies the conventional or standard accelerator link extending through a slot in the floorboard, having the pivot eye 11 (or some other fitting) operatively engaging the accelerator foot pedal. The lower end of this link 12 actuates other linkage (including 13 etc.) for operating the carburetor bell crank (not shown) in the usual manner. A stressed spring (not shown) inserted at some point along this linkage tends to close the carburetor throttle valve, and to maintain the accelerator pedal in an elevated position, thus decelerating the motor as the foot is raised.

Returning to Fig. 1, 5 and 6 are two accelerator pedals which are located for the convenience of each of the feet, and oscillate about the axes of the hinges 10 that fasten them to the floor. The U-rod or U-shaped member 7, constructed of a stiff metal shape, is rigidly riveted (see rivets 8) to each of the two accelerator pedals, forming therewith an inflexible unitary appliance. Only the one pedal 5 engages that accelerating link, which extends through the floorboard. Whenever the right-foot accelerator pedal is operatively depressed, the left-foot pedal oscillates concurrently and equally through the same arc, because of the torque-conveying U-rod 7. Likewise, when the pedal 6 is operatively oscillated, 5 concurs in the movement, and thereby actuates the carburetor linkage. Thereby, the acceleration duty may most readily be shifted from one to both feet, or from one to the other foot, according to the operator's requirements for minimizing his driving fatigue.

The lack of uniformity in the dimensions of motor vehicle equipment manufactured by different makers precludes a proper adaptation of one single size of my device to all vehicles. The pedals 5 and 6 must be farther apart in some installations than in others. For this purpose I construct different sizes in the member 7, each to take the same pedals 5 and 6. With the employment of extreme bending force the U-member can also be somewhat re-shaped for permitting the extremities to broaden out, or to narrow. In some instances the space between the clutch pedal 2 and the side of the vehicle body only barely admits the operation of the accelerator pedal 6. In such installations I prefer a raised flange projection 9 (see Fig. 3) upon the left edge of the pedal 2, for preventing the operator's foot from engaging the latter too far to the left side and thereby accidentally contacting the accelerator pedal 6 too, in his operation of the clutch pedal.

The flange 9 may be a simple accessory installation where the clutch pedal is not already so equipped. Where the space between the clutch pedal 2 and the side of the vehicle body is extremely limited it some times is even necessary to employ a special very narrow pedal to substitute for the one designated by the numeral 6.

Figure 3:
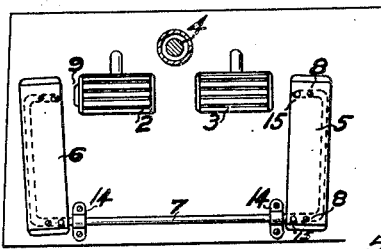
Figure 3 is a plan view of my device constructed slightly differently from that shown in Fig. 1.

It may be observed that the U-member 7 in Fig. 3 has a considerably modified form. The pedal 5 therein has two other small holes 15 in addition to those through which the engaging screws 8 project. This pedal may be detached from the U-member, the screws placed in the other holes 15, and then screwed into their former threaded recesses in the U-member. This operation will add some width to the space between the pedals, thus permitting of adjustment to different vehicles. Likewise, pedal 6 may be similarly re-located, and allow for additional extension. In the installation shown the U-member does its rotational movement within the brackets 14 as bearings, which also secure the entire device in place to the floor. By employing these bearing brackets 14 the hinges 10 may be dispensed with, should the latter present installation difficulties.

Figure 1:
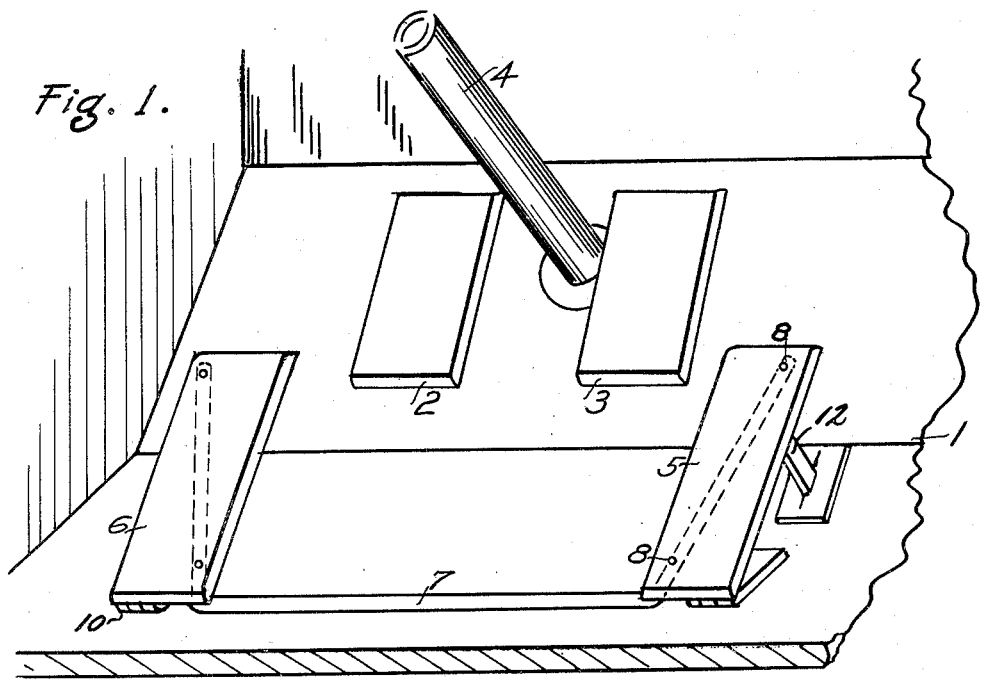
Figure 1 is a perspective view of a part of the front portion of the floor boards of a motor vehicle in which my invention has been installed.

A simpler and cheaper dual pedal, similar to what has been illustrated in Figs. 1 and 2, may be constructed by flattening the extremities of the U-rod member, for serving directly as pedals and dispensing with the extra plates, employing the bearing brackets 14, and a fitting for engaging directly the pivot connection 11 (see Fig. 2).

A modified form of dual pedal control, similar to that shown in Fig. 3, constructed for certain more difficult installations, may be had by employment of the U-member illustrated therein having a provision directly thereupon for engaging the floorboard accelerator link 12 (see Fig. 2). This may then be fitted into place to an entirety within the vehicle before attaching the treadle plates. The complete installation is thereupon accomplished without difficulty.

Figure 4:
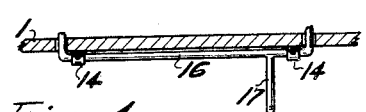
Fig. 4 is a front view of a small portion of my device illustrating an improved adaptation to a motor manufacturer's requirements.

An improved dual accelerator for employment as original equipment in an automotive vehicle may be constructed by bending the lower portion of the U-member into an off-set whereby this portion may be positioned underneath the floorboard as is 16 of Fig. 4. The two arms (not shown) of this U-member extend through slots in the floorboard 1 into a form thereabove similar to their shapes in Figs. 1 and 2, and may likewise be attached to treadle plates in the same manner. The bracket bearings 14 may be employed in this instance underneath the floor, and dispense altogether with treadle hinges. Further, a small additional arm 17 may be formed upon the portion 16 (or an extension thereof) of the U-member, having a pivot receiving hole at its outer end for direct operative engagement with the accelerator linkage, thereby removing the usual necessity of installing such linkage through a slot in the floorboard. Such a modification of my dual accelerator effectively obscures all of its parts, with the exception of the two treadle plates. But an installation of this type is difficult outside of the motor vehicle factory.

Figure 5:
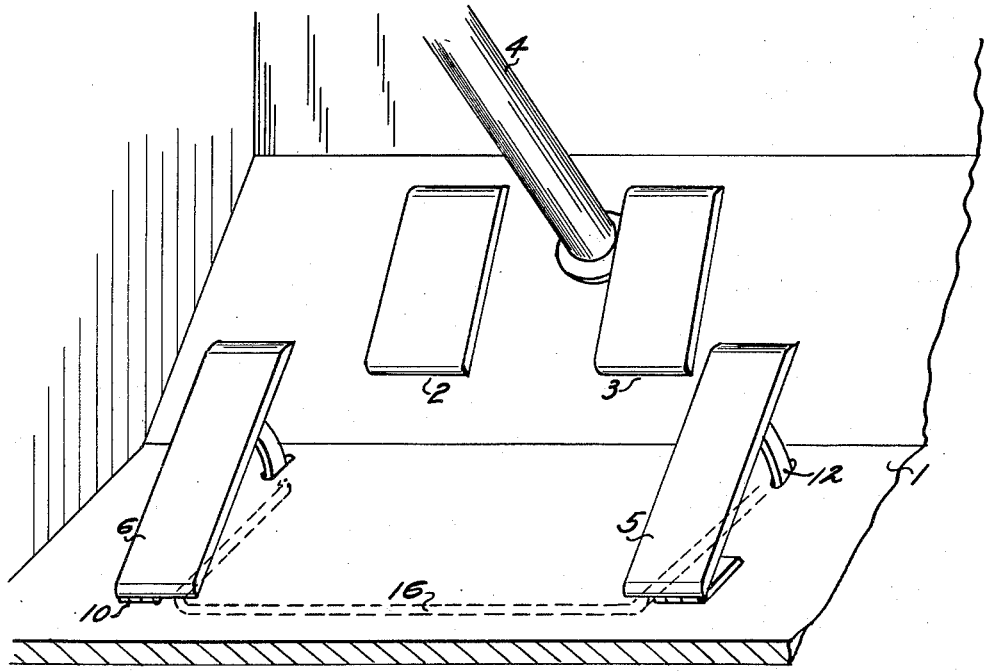
Fig. 5 is a view, in perspective, showing my device installed in place, of a form somewhat modified over that represented in Fig. 4, and disclosing a part of its under-the-floor mechanism.
Figure 6:
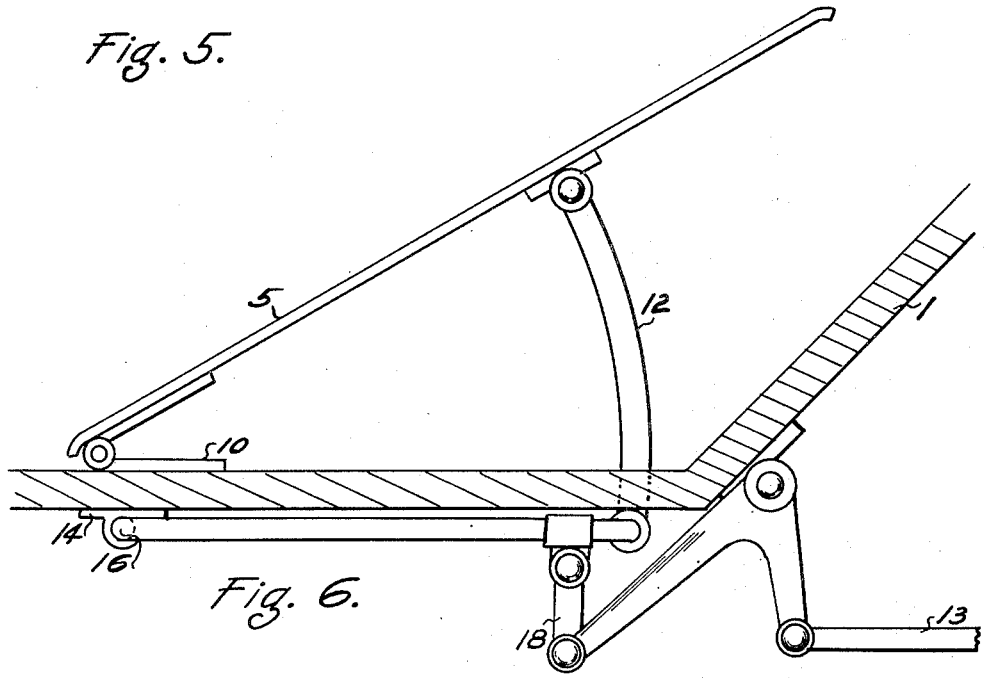
Fig. 6 is a side view of the dual accelerator illustrated in Fig. 5.

The design illustrated in Figs. 5 and 6, a modified form of that of Fig. 4, likewise has the rocker shaft 16 mounted underneath the floor, attached thereto with the bearing brackets 14. But the arms of this rocker shaft are located wholly underneath the floorboard, and engage at their outer ends the links 12 extending through slots in the floor, with which each of these accelerator pedals 5 and 6 are equipped. These links 12 are very similar to, or may be the same, as link 12 of Fig. 2. The normal accelerator linkage, 18, 13, etc. (see Fig. 6) may be driven by an arm or other element from the rocker shaft. This accelerator, like that in Fig. 4, presents difficulties in installation outside of the automobile factory, but is likewise superior in appearance over those forms shown in Figs. 1, 2, and 3.

With the above detailed description it is clear that any depressing force exerted upon the left side pedal by the corresponding foot is simultaneously transformed into a torque and is conveyed to the location of the right-side pedal, where it is delivered to and actuates the accelerating linkage. In a similar manner any depression of the right-side pedal by the right foot at all times actuates the left pedal to exactly the same degree. I have found this latter provision to be of extreme importance, in my extended experimentation. When the operator is employing the right foot for accelerating and desires, during driving, to shift the duty to the left foot, he then merely places the latter in position and proceeds with its use in accelerating. But, where the left pedal does not at all times follow concurrently the movement of the right, he must then, in making such a shift of feet, first position his left foot, contact the pedal, and carefully feel his way down in its actuation to the point of overtaking the acceleration before the shift of feet can be completed. The latter is exceedingly annoying, and almost altogether discourages the free use of a dual-control accelerator.

It is also very desirable that the two accelerator pedals be of similar lengths, for enhancing the operator's opportunities of driving in a position of completely equalized posture.

My observation, during experimentation, has further indicated that a forwardly oscillating accelerator pedal is quite superior to one which rocks backwardly during acceleration. The former has its oscillating axis towards the rear, while the other rotates upon an axis usually located at the front-most extremity of the driver compartment. In either event the operator depresses the pedal with a forward oscillation of the foot. With the one he imparts identically this same motion to the pedal. In the other he actuates a reversed rotation upon the pedal, thereby necessitating some sliding of his toe thereupon, introducing an uncertain friction factor with every movement of the part, and presenting difficulties to smooth acceleration by the operator of a dual-control, as well as increasing his required exertion.

I don't believe a successful dual-control accelerator had ever before been built or devised, combining these features of forwardly oscillating pedals of similar length, with concurrent and equal angular rotation at all times, having no parts of the device located out in front of the clutch or brake pedals; and with a simplicity of installation oftentimes approaching that of a single accelerating pedal, (the device, in several designs, rests wholly above the floor boards, with no portion thereof requiring adaptation underneath the floor, or in slots therethrough).

In my employment herein, including the claims, of the term, "forward torque," I refer to a clockwise acting torque as observed by one who is facing the car from a position upon the right side, and by "treadle-type" pedal I have reference to a treadle of any shape for accommodating much of the length of the foot, mounted upon a transverse axis, with the latter located nearer the rear extremity of the pedal, whereby the actuation of the treadle is attained chiefly by the depressing exertion of the front portion of the foot, and wherein the treadle is thereby oscillated in a forwardly rotating direction.

Having described the invention what is claimed as new is:

1. In combination a U-shaped member provided with fastenings formed for attaching to the floor of a motor vehicle at points between the feet of the operator, permitting considerable oscillation of the arms of such U-member upon an axis transverse to the length of the vehicle, two generally similar flat treadle plates provided with means for rigidly attaching to each of the arms of said U-member for comfortable engagement by either or both feet of the operator, for equal and like direction of movement of an accelerator linkage of the motor vehicle.

2. In combination a U-shaped member equipped with means for attaching to the floor of a motor vehicle with the cross-bar beneath the heels of the driver, said means providing for oscillation of the U-member upon an axis transverse to the car's length, and at such position as to be held by an accelerator with the extremities of the U-member some distance off the floor, and two like flat treadle plates provided with means for attaching rigidly to each of the arms of the U-member whereby some lateral adjustment may be made according to the form and requirements of the particular motor vehicle, one of the treadle plates being so disposed as to the accelerator linkage as to actuate the linkage, whereby the operator may readily employ either or both feet in accelerating the motor vehicle.

3. In combination a U-shaped member provided with like, detachable treadle plates rigidly secured thereto upon each arm, said U-member constructed of a material providing complete rigidity thereof in operation but permitting of some reforming for adjusting to the particular requirements of the vehicle (through the application of sufficient bending force), connections for attaching the unit to the floor of the vehicle beneath the operator's feet and providing for concurrent, like and equal, oscillation of the arms upon an axis transverse to the vehicle's length, and means for operatively connecting one of the treadle plates to the accelerator linkage, whereby the vehicle's speed may readily be governed by either or both of the feet through their respective operation of one or each of the said treadle plates.

4. A device consisting of two treadle-type pedals, a U-shaped member rigidly connecting these pedals one with the other in an approximately parallel coplanar position and means attachable to a vehicle floor for equal oscillation of the pedals whereby the operation of one imparts a like actuation to the other, one pedal being adapted for operation of the accelerating mechanism of the motor vehicle, and whereby the varying pressure exerted by either or both feet upon one or each of these pedals may be made to control the speed of the motor.

5. A device consisting of a treadle-type pedal with hinge connections for securing to the floor of a motor vehicle and a U-shaped member of such form and dimensions that one arm of the U may be rigidly attached to the treadle-type pedal accelerator of the motor vehicle and the other arm similarly to the said pedal of the device, thereby causing both pedals to operate in an exactly similar manner when either is actuated, and enabling the vehicle operator to accelerate his speed with either or both feet.

6. In combination within a motor vehicle having the conventional floorboards, and the usual accelerator member connected through linkage to the carburetor throttle valve so that a variation in pressure thereupon by one foot of the driver controls the speed of the car, two like, coplanar oscillating-type foot pedals arranged for convenient engagement by both the left and the right foot of an operator in normal driving position, with their rotational axes nearest the driver's heels, these pedals having a member connecting one rigidly to the other such that the operation of either actuates the other in exact unison, equally and unidirectionally, and means for pivotally attaching the rear end of the united assembly to the floor, one of said pedals arranged contiguous to the said accelerator for operation thereof when ever either of said pedals is depressed.

7. An accelerator pedal for use in motor vehicles, of sufficient width to permit comfortable forward and downward operation by either or both feet of the driver, provided with a large U-shaped opening near the center through which the clutch and brake pedals and steering rod safely operate with sufficient clearances, and connections for pivotally attaching the rear end of the pedal in place to the floor, one forward extremity of the pedal adapted for operation of the throttle accelerator linkage by a forward and downward depression of either foot from its angle without reverse frictional slippage of the foot on the pedal.

8. The combination within a motor vehicle of two forwardly directed treadle-type pedals arranged above the floor at suitable locations underneath the feet of the operator, a connecting member rigidly attaching one treadle with the other coplanar and in such manner that any angular movement of either treadle upon an axis transverse to the vehicle's length is completely and equally imparted to the other, and means for pivotally connecting the heel end of the united device to the floor for directly and operatively depressively engaging one of the treadles to the accelerator linkage, whereby the motor vehicle may be accelerated by either or both of the operator's feet.

9. A device consisting of two oscillating-type pedals having their axes of oscillation and their rear ends underneath the heels of the driver's feet, a rotative member adjacent the driver's heels rigidly connecting one treadle with the other whereby any oscillation imparted to one actuates the other to exactly a like degree and arc on the pedal axis, and means for operatively and directly connecting one of the said pedals to the accelerator linkage, wherein no parts of the device lie normally in front of the toes of the operator, and whereby the operator may accelerate the vehicle by the use of either or both of the feet.

10. A U-shaped rod or member with means upon each arm thereof capable of rigidly attaching said arms to treadle-type accelerator pedals in a motor vehicle, for conveying a depressing force from either or both feet of the operator to the accelerating linkage of the motor vehicle.

11. Treadle-type pedals with screw holes adjacent their ends and screws therefor adapted to be securely attached to tapped arms of a U-member which is pivotally mounted upon the floor of the driver's compartment of a motor vehicle whereby a depressing force exerted by either or both feet of the operator may serve to actuate the accelerating mechanism of the motor.

12. In combination a U-shaped inflexible member non-axially shiftable and provided with means for attaching directly to the floor of a motor vehicle at points near the heels of the driver and permitting of like downward and forward angular actuation of arms thereof, for operatively engaging the floorboard acceleration link, and two treadle plates with means for rigidly securing one upon each arm of said U-member, whereby the operator may, with either of his feet in normal driving position, exert force in common foot motion on the ankle, upon either of the said treadle plates and thereby actuate the said floorboard acceleration link for controlling the vehicle's acceleration.

13. Means for transmitting to the conventional linkage of a motor accelerator a downward force exerted by the left foot of an operator, consisting of a pair of similar, rigidly connected, sole receiving pedals having a common axis at their rear ends in a position contiguous to the motor operator's heels; the connected pedals moving in like arcs in the same direction radially so that pressure of the sole of either foot on its heel as a pivot will actuate the linkage with equal down stroke of the pedals.

14. A unitary appliance for actuating the conventional accelerator of a motor with either or both feet of the motor operator, comprising a pair of similar, foot actuated pedals having a rigid connection and equally, concurrently depressible, on a common rear end axis, downwardly and forwardly by a like motion of either foot or both feet for imparting a corresponding motion to a relative accelerator element of an installed accelerator.

15. A dual accelerator control for motors as set forth and which accelerator includes a downwardly depressible member; said control including a pair of coplanar foot-sole pedals for direct engagement by either or both feet of a motor operator, the pedals being rigidly connected in coplanar and spaced relation to therebetween clear other conventional motor parts and inoperative on said parts; the pedals extending generally forward from the driver's heel position and having a common axis of rotation at their rear or heel ends for action only forward thereof, and each pedal being arranged for depression by a forward and downward oscillation of the respective foot from the ankle joint; one pedal being adapted for direct motivation of the cooperative member of the accelerator.

16. A foot operated, dual accelerator control for a motor, including a rockshaft having an axis of rotation, when mounted at a driver's feet, in a position from heel to heel; the shaft having coplanar arms projecting forwardly from the heel position and having pedals for both feet one of which is adapted for installation over a footboard, motor accelerator member; whereby a downward pressure of either foot will be transmitted directly and without reversal of the foot motion to the said member.

17. Treadle-type pedals with fittings adapted for rigidly attaching to depressible arms of a U-shaped member which is pivotally mounted at the operator's heel position upon the floor of the driver's compartment of a motor vehicle whereby a depressing force exerted by either or both feet of the operator may serve to actuate the accelerating mechanism of the motor.

18. A motor-control device consisting of two oscillating-type pedals, one located at each of the motor operator's feet, having their axes of oscillation and their rear ends nearest the operator's heels, means connecting the pedals for concurring the oscillating movement of each pedal with that of the other whereby any oscillation imparted to one actuates the other to a like degree and arc upon the pedal axis, and means for operatively engaging one of the movable parts of the said device to the motor accelerator linkage, whereby the motor's speed may be controlled by the actuation of either foot upon a pedal, or by both feet simultaneously.

19. In combination with a motor vehicle two oscillating-type pedals, one located at each of the motor operator's feet, having their axes of oscillation and their rear ends near the operator's heels, an inflexible transversely disposed and oscillating member with arms, located underneath the floor, having links extending through slots in the floor operatively connecting each aforesaid pedal with separate arms of the said member for concurring the oscillation of one pedal with that of the other whereby any rotation imparted to one actuates the other to a like degree and arc upon the pedal axis, and means upon some element of the said transversely disposed member for operatively engaging the carburetor control linkage.

20. The device of claim 18, and the connecting means having capacity for relative lateral adjustment of the pedals.

21. The device of claim 18, and the said connecting means including an adjustable attachment enabling the change of distance between the pedals.

ARTHUR SEYMON MARTIN.